Figure 1:
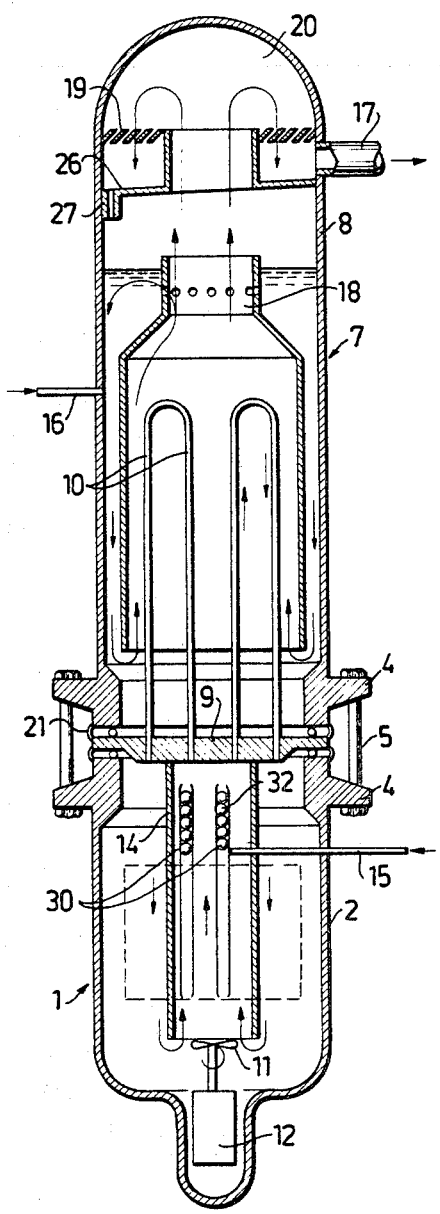

Oct. 15, 1968

P. H. E. MARGEN 3,406,092

DEVICE FOR CONTROLLING THE REACTIVITY OF A NUCLEAR REACTOR

Filed Dec. 18, 1964

INVENTOR

BY

ATTORNEY

United States Patent Office 3,406,092
Patented Oct. 15, 1968

3,406,092
DEVICE FOR CONTROLLING THE REACTIVITY OF A NUCLEAR REACTOR
Peter Heinrich Erwin Margen, Roslags-Nasby, Sweden, assignor to Aktiebolaget Atomenergi, Stockholm, Sweden, a company of Sweden
Filed Dec. 18, 1964, Ser. No. 419,501
Claims priority, application Sweden, Dec. 20, 1963, 14,380/63
2 Claims. (Cl. 176—35)

The present invention relates to a device for controlling the reactivity of nuclear reactors having a forced circulation, and particularly reactors of the pressurized water type.

In nuclear reactors, where the coolant is brought to flow through the reactor hearth or core by pumps or the like, an immediate lowering of the reactivity of the reactor in the event of reduced or interrupted cooling is required for limiting the temperature increase in the reactor. For obtaining such a decrease in reactivity there has usually been used a means for transferring impulses from for instance the pumps, the coolant circulation or the like, which means actuates a mechanism causing insertion of neutron absorbers in the core or hearth, so that the reactivity is lowered. In this case one is dependent on a proper functioning of the system in case of circulation disturbances, and the system must not cause scram, i.e. shut-down, without well grounded reasons, which would involve time-consuming and expensive shut-downs.

One object of the present invention is thus to provide a reactivity controlling device which is simple, reliable, requires a small space, and works independent of impulse transferring means. A particular object of the invention is to provide a reactivity controlling device without using lead-throughs, i.e. no external means are necessary for the operation of the device, which is completely enclosed in the reactor.

According to the invention there is provided a device for controlling the reactivity of a nuclear reactor having a forced coolant circulation, the coolant flowing upwardly through the reactor hearth because of the pressure drop thereover and the device comprising at least one tube extending a distance above the hearth and at least one neutron absorbing body freely movable in said tube and having a higher density than said coolant, and the device is characterized in that the tube is open at both ends, both of which open into the reactor, the tube having its lower end connected to a point in the circulation system of a higher pressure and its upper end to a point of a lower pressure, so that the neutron absorbing body by the flow in the tube caused by the pressure drop thereover at normal coolant circulation is held up in the upper part of the tube above the hearth but at reduced or interrupted coolant circulation sinks down in the lower part of the tube in the hearth, a lowering of the reactivity of the reactor being obtained. In the flow passage of the tube a variable restriction may be arranged, by which the position of the absorber body in the tube and thus also the reactivity of the reactor can be controlled. The absorber bodies may for instance consist of balls and the neutron absorbing material thereof may be any of the known neutron absorbing materials, such as boron steel, a silver-cadmium-indium alloy or the like.

Figure 2:
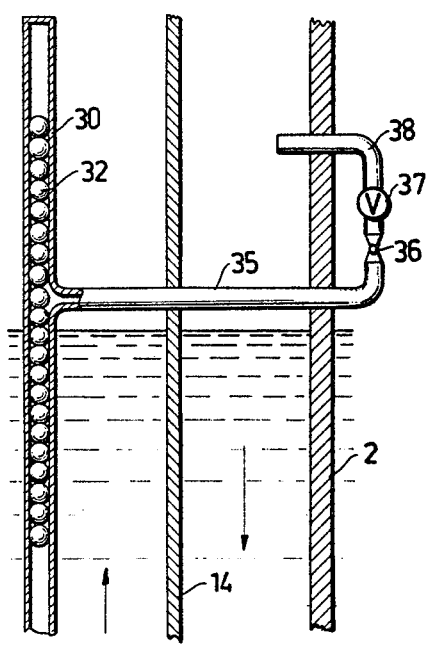

The invention will now be described with non-limiting examples thereof with reference to the appended drawings, in which FIG. 1 shows a vertical section through a nuclear reactor assembly, in which a device according to the invention is incorporated and FIG. 2 shows another embodiment of the invention, by which fine adjustment of the reactivity can be performed.

The reactor assembly schematically illustrated in FIG. 1 is a so-called compact reactor and contains a nuclear reactor generally indicated 1 and a heat exchanger generally indicated 7. The reactor has a cylindrical pressure vessel 2 having a plane lid 9. The hearth or core of the reactor is indicated with dashed lines. The pressure vessel contains a pump 11 with a driving motor 12 and a partition wall in the form of a tube 14 extending from the lid 9 down through the hearth and ending at about the level of the pump 11. To the pressure vessel is furthermore a tube 15 connected being connected to a pressurizing assembly not shown by which the desired pressure is maintained in the pressure vessel in a known manner.

The heat exchanger 7 consists of a cylindrical pressure vessel 8 having a plane bottom 9 which forms the aforementioned lid of the reactor and being coaxial with the pressure vessel of the reactor. The lid 9 is at the same time tube plate, in that a plurality of U-formed tubes 10 are attached thereto. One end of each tube is attached to the part of the tube plate lying within the tubular intermediate wall 14 in the reactor vessel. The other end of each tube is attached to the surrounding annular part of the tube plate. The heat exchanger is provided with a conduit 16 for the supply of feed water and a conduit 17 for the outlet of steam and contains a first water separator 18 of a known type. The upper part 20 of the heat exchanger acts as a steam dome and contains a second water separator 19 and a bottom 26 for the separated water, the bottom being provided with an outlet pipe 27. The tube plate 9 is clamped between the pressure vessels of the reactor and the heat exchanger by means of flanges 4 provided on said vessels and bolts 5. Radial movement between the tube plate and the flanges is admitted for instance by means of roller bearings 21.

A number of Zircaloy tubes 30, two of which are shown in the drawing, extend down in the reactor hearth to about the lower edge thereof, where they communicate with the coolant flow from the pressure side of the pump 11. The tubes 30 are placed within the partition wall or tube 14 and extend upwardly a distance above the hearth. In each tube a number of absorber bodies in the form of boron steel balls 32 are inserted, the balls having a density greater than that of the coolant. Both ends of the tube 30 have openings, the diameters of which are slightly smaller than that of the balls 32, which in turn have a diameter slightly smaller than the inner diameter of the tube 30. The balls 32 are thus free to move upwardly and downwardly in the tube 30.

The pump 11 forces the pressurized water through the reactor and the tubes in the direction indicated by the arrows. At normal coolant circulation the flow through the tube 30 caused by the pressure drop thereover holds the balls 32 up in the upper part of the tube. However, by reduced or completely interrupted coolant circulation the pressure drop over the tube 30 decreases or disappears, and the boron steel balls 32 descend into the lower part of the tube 30, which is in the hearth, the reactor being shut down. By providing hydraulic valves (not shown) at the upper ends of the tubes 30, it is possible by simply closing the valves deliberately to shut down the reactor with maintained cooling.

The advantages of the device described are obvious. It is reliable, as it directly gives response to failing coolant independent of impulse transferring means. It also entails saving of space, as the number of lead-throughs in the reactor tank is reduced, and as the tubes for the absorber bodies do not need to be straight.

In FIG. 2 another embodiment of the invention is shown, by which fine adjustment of the reactivity of the reactor can be obtained. In this embodiment the tube 30 having the same extension as in the embodiment described above is closed at its upper end. A distance from the upper end of the tube a side conduit 35 is connected, which extends through the wall of the tube 14 and out through the reactor vessel 2 and which by a variable restriction 36 and a scram valve 37 is connected to a conduit 38 extending through the vessel 2 into the reactor at the low pressure side of the partition wall 14. Boron steel balls are again arranged in the tube 30, the clearance between the balls and the tube above the point of connection of the conduit 35 being large, so as to enable the balls to move easily in the water, the clearance below said point being small, for enabling the balls therein to support the upper balls.

By this arrangement it is possible by varying the restriction 36 to vary the position of the balls in the tube 30 and thus also the reactivity of the reactor. If the resistance of restriction 36 is decreased, the balls 32 move upwardly and vice versa. By failing cooling caused by for instance a pump failure the pressure drop over the tubes 30, 35, 38 vanishes and the balls 32 descend into the lower part of the tube, where they contribute to the shut down of the reactor. The scram valve 37 serves the same purpose as do the hydraulic valves mentioned above. As in this case for the sake of reactor stability balls with a small neutron absorbing capacity, i.e. with a small reactivity equivalence, are used, the controlling means is suitably completed with devices according to FIG. 1, in which the reactivity equivalence of the absorber bodies may be considerably higher.

The devices described above can be modified in many respects. The absorber bodies may for instance be formed as straight cylinders. It is of course possible to use the device also in other reactors than the type described. The application is only limited in the respect that a forced circulation of the coolant must be used. The device may be used in gas-cooled reactors, but in this case it might be necessary to use absorber bodies having a lower density.

What is claimed is:

1. A device for controlling the reactivity of the nuclear reactor having a forced coolant circulation, the coolant flowing upwardly through the reactor core because of the pressure drop thereover, said device comprising at least one tube extending partly in the core and partly above said core, said tube containing at least one neutron absorbing body freely movable up and down in said tube, the lower end of said tube being open into the reactor and the upper end of said tube being closed, a side conduit connected to said tube at a location between said ends of the tube, the free end of the side conduit being connected to a zone in the circulation system of the reactor having a lower pressure than that of the zone to which the open lower end of the tube is connected, the side conduit containing a variable restriction for controlling the rate of fluid flow therein.

2. A device as defined in claim 1 in which the neutron absorbing body consists of a plurality of balls of a neutron absorbing material placed on top of each other in the tube.

References Cited

UNITED STATES PATENTS

| | | | |
|---|---|---|---|
| 3,123,532 | 3/1964 | Michel | 176—86 |
| 3,223,589 | 12/1965 | Ziegler | 176—22 |
| 3,228,847 | 1/1966 | Parkinson et al. | 176—35 |

FOREIGN PATENTS

| | | |
|---|---|---|
| 250,129 | 8/1963 | Australia. |
| 1,343,245 | 10/1963 | France. |

CARL D. QUARFORTH, *Primary Examiner.*

H. E. BEHREND, *Assistant Examiner.*